US012538931B2

United States Patent
Bernaert et al.

(10) Patent No.: US 12,538,931 B2
(45) Date of Patent: Feb. 3, 2026

(54) CACAO PULP DERIVED POWDER, METHOD FOR OBTAINING THEREOF AND ITS APPLICATIONS

(71) Applicant: Cabosse Naturals NV, Halle (BE)

(72) Inventors: Herwig Bernaert, Halle (BE); Maximilian Greiner, Halle (BE)

(73) Assignee: Cabosse Naturals NV, Halle (BE)

( * ) Notice: Subject to any disclaimer, the term of this patent is extended or adjusted under 35 U.S.C. 154(b) by 1198 days.

(21) Appl. No.: 17/299,715

(22) PCT Filed: Dec. 5, 2019

(86) PCT No.: PCT/EP2019/083895
§ 371 (c)(1),
(2) Date: Jun. 3, 2021

(87) PCT Pub. No.: WO2020/115248
PCT Pub. Date: Jun. 11, 2020

(65) Prior Publication Data
US 2022/0071228 A1    Mar. 10, 2022

(30) Foreign Application Priority Data

Dec. 5, 2018   (EP) .................... 18210520

(51) Int. Cl.
*A23G 1/48* (2006.01)
*A21D 2/36* (2006.01)
*A23C 9/156* (2006.01)
*A23G 1/00* (2025.01)
*A23L 27/12* (2016.01)
*C12G 3/06* (2006.01)

(52) U.S. Cl.
CPC ............. *A23G 1/48* (2013.01); *A21D 2/36* (2013.01); *A23C 9/156* (2013.01); *A23G 1/0016* (2013.01); *A23L 27/12* (2016.08); *C12G 3/06* (2013.01); *A23V 2002/00* (2013.01)

(58) Field of Classification Search
None
See application file for complete search history.

(56) References Cited

U.S. PATENT DOCUMENTS

| 3,809,778 A * | 5/1974 | Drevici et al. ....... A61K 8/9717 |
| | | 426/481 |
| 4,289,790 A | 9/1981 | Bruelle |
| 2013/0316056 A1 | 11/2013 | Parducci |
| 2021/0161168 A1* | 6/2021 | Festring .................. A23G 1/40 |

FOREIGN PATENT DOCUMENTS

| EP | 0442421 A2 | 8/1991 |
| EP | 3114939 A1 | 1/2017 |
| EP | 3114942 A1 | 1/2017 |
| FR | 2828379 A1 * | 2/2003 |
| WO | 2020/115248 A1 | 11/2020 |

OTHER PUBLICATIONS https://www.nutritionaloutlook.com/view/cacao-pulp-its-not-just-waste-product-cocoa-anymore, by Robby Gardner, Jun. 5, 2013 (Year: 2013).*
Nutritional aspects of chocolate by Herwig Bernaert—Dec. 2006 3 pages (Year: 2006).*
https://www.fao.org/fao-who-codexalimentarius/codex-texts/list-standards/en/; standard for "cocoa powder".*
ISR-WO dated Feb. 7, 2020 for parent application PCT/EP2019/083895.
Anonymous, "Effect of drying methods on the quality of powdered cocoa pulp juice", Jan. 1, 2006 (Jan. 1, 2006), Retrieved from the Internet: URL:http://agris.fao.org/agris-search/search.do?recordID=MY2011050024XP055663581 [retrieved on Jan. 30, 2020].
Fabien Declercq et al, "Process for Extracting Sugars from Cocoa Pulp", Research Disclosure, Kenneth Mason Publications, Hampshire, UK, GB,vol. 582, No. 84, Oct. 1, 2012 (Oct. 1, 2012), p. 872, XP007141662.

* cited by examiner

*Primary Examiner* — Jyoti Chawla
(74) *Attorney, Agent, or Firm* — Vorys, Sater, Seymour and Pease LLP

(57) ABSTRACT

The current invention relates to a free-flowing cacao pulp powder obtainable from cacao pulp material, wherein said cacao pulp material is fresh cacao pulp, cacao pulp juice, cacao pulp concentrate or any mixture thereof, characterized by a moisture content less than 8 wt %, preferably less than 5 wt %, most preferably less than 3 wt %. The invention relates to a cacao pulp juice, obtainable from fresh cacao pulp substantially devoid from cacao pod husks and cacao beans, characterized by a Brix value of 10-35. The invention relates to a method for producing cacao pulp juice, from fresh cacao pulp substantially devoid from cacao pod husks and cacao beans. In another aspect, the invention relates to a method for obtaining a free-flowing cacao pulp derived powder from cacao pulp material.

12 Claims, No Drawings

CACAO PULP DERIVED POWDER, METHOD FOR OBTAINING THEREOF AND ITS APPLICATIONS

FIELD OF THE INVENTION

The present invention pertains to the technical field of utilization of cacao byproducts, in particular cacao pulp. In a first aspect, the present invention relates to a free-flowing cacao pulp derived powder, obtainable from cacao pulp material and a method for producing thereof. In a second aspect, the present invention relates to a cacao pulp juice and a method for producing thereof. In another aspect, the present invention relates to a use of free-flowing cacao pulp derived powder in food products.

BACKGROUND

*Theobroma cacao* L., also known as a cacao tree, is a small tree in the family Malvaceae. A cacao tree produces about 20 usable pods a year. The cacao pods contain seeds, known as cacao beans, covered in a sweet, white mucilaginous pulp, surrounded by pod husks. The cacao beans are used as cacao mass, powder or butter in various food applications. Given the value and great demand of the cacao beans, the harvesting and processing of cacao is mainly focused on minimizing damage to the cacao beans, while very little care and attention is paid to the pulp and pod husks surrounding the seeds.

Despite the importance of cacao as an agricultural export commodity, only approximately 10% of the gross weight of cacao pod is utilized for cacao mass, cacao powder and cacao butter production. The majority of the total cacao pod weight (cacao pulp and cacao pod husks) is discarded as cacao waste.

Cacao pulp typically contains 80-90% water, 10-15% sugar, 0.4-2.0% citric acid, 1% pectin and other constituents including pentosans and polyphenols. Cacao pulp is sometimes referred to as a "superfood" having significant health benefits for its high polyphenol and antioxidant content. Cacao pulp is generally rich in fermentable sugars, such as glucose, fructose and sucrose, and has a low pH of 3.0-3.5, mainly because of the presence of citric acid. The high water and sugar content and a low pH make cacao pulp a suitable medium for microbial growth. For this reason, cacao pulp is conventionally used to assist fermentation of cacao beans, during which the pulp liquefies and drains away. However, not all pulp is required for a good fermentation of cacao beans. It would be desirable to provide cacao products which would allow utilization of the nutritionally beneficial ingredients of the cacao pulp.

WO 2017/044610 discloses a method for producing syrups and molasses from cacao pulp. In particular, the invention relates to a process for producing cacao syrup from the liquefied pulp.

WO 2017/062603 relates to a packaged cacao pulp based edible composition, that is dimensionally stable, ambient stable for at least 12 months, has a moisture content greater than 50 wt %, is commercially sterile, is free of artificial sweeteners, has a solids content greater than 10 wt %, and does not exhibit syneresis. A method for preparation of said edible composition is also disclosed.

At present, the vast majority of crystalline sugar is made by extracting of the sugar juice from sugar beet or sugar cane plants. Through slight adjustments in the process of cleaning, crystallizing and drying of the sugar and varying the level of molasses, different sugar varieties can be obtained. Sugar is mostly produced by charging a hot, concentrated syrup into pans, drawing a vacuum over the pans and evaporating a proportion of the water from the sugar syrup. A portion of the sugar then crystallizes out and is separated, generally by a centrifuge. The mother liquor is then re-boiled and recycled to produce another crop of sugar crystals. This process may be repeated a number of times, until the final molasses is produced, from which the sugar cannot readily be crystallized. This final molasses is unsuitable for human use and is utilized as an animal feed or as a source of low grade carbohydrates. Although an extremely pure sugar is produced in the first crop, subsequent crops are of decreasing purity.

For all above-mentioned reasons, refined sugar obtained in such process is considered unhealthy. It increases acidity levels, spikes insulin, decreases the immune system, feeds yeast infections, decays teeth, etc. Thus, there is a constant need for an adequate substitute for refined sugar. There is a need for a natural sweetener derived from other plant sources and preferably characterized by a pleasantly sweet aroma and a texture suitable for use in confectionery products.

The present invention aims to resolve at least some of the problems and disadvantages mentioned above.

SUMMARY OF THE INVENTION

The present invention and embodiments thereof serve to provide a solution to one or more of above-mentioned disadvantages. To this end, the present invention relates to a free-flowing cacao pulp derived powder obtainable from cacao pulp material, wherein said cacao pulp material is a fresh cacao pulp, cacao pulp juice, cacao pulp concentrate or any mixture thereof.

Cacao pulp is considered as a cacao by-product, used only to limited extent for assisting the fermentation of cacao beans. The main constituents of cacao pulp are water and sugars, which make it prone to degradation and microbiological contamination.

However, cacao pulp is rich various macro- and micronutrients and is characterized by a pleasant aroma. The present invention relates to a free-flowing cacao pulp derived powder which possesses the nutritive value of cacao pulp, but has stability and texture suitable for the use in food products. The free-flowing cacao pulp derived powder of the invention brings a pleasant, sweet, cacao aroma and it is particularly suitable for confectionery products.

The term "cacao pulp", as used herein, means the white, sweet mucilaginous, liquid, which originates from mucilage covering cacao beans inside cacao pods, and which is substantially devoid from cacao beans and cacao pod husks.

The term "fresh cacao pulp", as used herein, means the unprocessed cacao pulp obtainable by depupling of cacao beans after opening cacao pods.

The term "free-flowing", as used herein, means that the powder has the ability to flow in a desired manner in a specific piece of equipment. Said free flowing properties of a powder can be defined by parameters such as powder density, moisture content, particle size and shape, and flow function of the powder, cohesion coefficients, friction coefficients of, and the like.

A free-flowing cacao pulp derived powder has several advantages in use, particularly on an industrial scale. The powder may be handled, stored and transported relatively easily and energy-efficiently, as compared with, for example, solid materials that are not flowable. This advantage is particularly important in combination with the ability to avoid a liquefying step in the process, which involves the use of energy to melt solid materials, and also to cool the liquid materials.

The term "powder", as used herein refers to relatively fine particles, and it is not intended to denote any particular physical shape.

In a preferred embodiment, the free-flowing cacao pulp powder, obtainable from cacao pulp material, wherein said cacao pulp material is fresh cacao pulp, cacao pulp juice, cacao pulp concentrate or any mixture thereof, characterized by a moisture content less than 12 wt. %, preferably less than 8 wt %, more preferably less than 5 wt %, most preferably less than 3 wt %.

Requirements regarding the moisture content of free-flowing substances are relatively low, as the increased moisture content leads to a change in the crystal structure and the texture. Thus, ensuring the moisture content of less than 12 wt % is one of the crucial parameters to obtain a cacao pulp derived powder of satisfying organoleptic and texture characteristics.

The free-flowing cacao pulp derived powder of the invention is characterized by a certain sweetness value.

The term "sweetness value" as used herein, means a sweetness of a substance rated relative to the sweetness of a sucrose, which has a sweetness perception value of 1.

In another preferred embodiment, the free-flowing cacao pulp derived powder is characterized by a crystalline structure.

In a second aspect, the present invention relates to a cacao pulp juice. More particular, the cacao pulp juice is obtainable from fresh cacao pulp substantially devoid from cacao pod husks and cacao beans. Cacao pulp juice of the invention is characterized by a value of 10-35 Brix degrees.

The term "Brix degrees", as used herein, represents the sugar content of an aqueous solution. One degree Brix is 1 gram of sucrose in 100 grams of solution and represents the strength of the solution as percentage by mass. If the solution contains dissolved solids other than pure sucrose, then the Brix only approximates the dissolved solid content.

In a third aspect, the present invention relates to a method for producing cacao pulp juice. Said method comprises the steps of: a) removing cacao pod husks and cacao beans from the whole cacao fruit to obtain fresh cacao pulp; b) treating the fresh cacao pulp with pectinase enzymes to obtain a cacao pulp juice; c) performing optional steps of i) removing of the water insoluble parts, ii) clarification of the cacao pulp juice, and iii) filtration of the cacao pulp juice, wherein said optional steps are to be performed in any order and wherein said optional steps are optionally partly or fully combined; d) optional pasteurizing of cacao juice in at a temperature between 70-100° C. during 10-90 sec; obtaining the juice; and e) optional concentrating the juice by removal of water obtaining a cacao pulp concentrate, characterized by a value of 35-90 degrees Brix; and f) optional freezing of the collected juice or concentrate.

The method of the invention is a simple, fast, easily controllable and reproducible process, which results in the production of a cacao pulp derived products characterized by a controllable and well-defined composition.

In another aspect, the present invention relates to a cacao pulp concentrate having a value of 35-90 degrees Brix, obtainable by the method of the invention. Said cacao pulp concentrate can be used as an intermediary product for chocolate production or it can be directly consumed in food products.

In a fourth aspect, present invention relates to a method for obtaining a free-flowing cacao pulp derived powder. The method comprises the steps of: a) concentrating the cacao pulp material to 70-95 degrees Brix at temperature 100-130° C.; b) kneading; c) adding of seeds for crystallization; d) kneading to obtain a crystal growth; e) temperature-pressure treatment until formation of solidified product, preferably temperature-pressure treatment at a temperature of 45-100° C. and pressure of 5-1000 mbar until formation of a solidified product; f) drying of the solidified product; g) optional grinding solidified product to obtain cacao pulp derived powder, wherein said cacao pulp material is cacao pulp starting material, cacao pulp juice, cacao pulp concentrate or any mixture thereof.

In another aspect, the present invention relates to a method for obtaining a free flowing cacao pulp derived powder from cacao pulp material, comprising the steps of:
  a) temperature-pressure treatment of the cacao pulp material until formation of a solidified product, preferably temperature-pressure treatment at a temperature of 45-100° C. and pressure of 5-1000 mbar until formation of a solidified product;
  b) freeze drying of cacao pulp derived material with optional addition of cacao powder and or optional addition of partially or pre-crystallized concentrate
  wherein said cacao pulp material is cacao pulp starting material, cacao pulp juice, cacao pulp concentrate or any mixture thereof.

In another aspect, the present invention relates to a method to obtain the free-flowing cacao pulp derived powder, wherein said method comprises freeze drying step.

In another aspect, the invention relates to a method for obtaining a free flowing cacao pulp derived powder from cacao pulp material, comprising the steps of:
  a) temperature-pressure treatment of the cacao pulp material until formation of a solidified product, preferably temperature-pressure treatment at a temperature of 45-100° C. and pressure of 5-1000 mbar until formation of a solidified product;
  b) spray drying on a carrier
  wherein said cacao pulp material is cacao pulp starting material, cacao pulp juice, cacao pulp concentrate or any mixture thereof. The present invention relates to obtaining of the free flowing cacao pulp derived powder in a method which comprises the spray drying on a carrier. By employing of the methods of the invention, it is possible to obtain cacao pulp derived powder as a free-flowing powder, which was not possible in the prior art. The method of the invention enables obtaining said powder using either fresh cacao pulp, cacao pulp juice, cacao pulp concentrate or any mixture thereof as starting materials.

In a fifth aspect, the present invention relates to a use of cacao pulp derived powder of the invention in a food product. The use as described herein provides an advantageous food product of a more clean label, and sweetened with a natural, cacao derived sugar. The amount of sucrose of the product is decreased, and at the same time, the product is characterized by a nice fruity-cacao aroma.

In a sixth aspect, the present invention relates to a use of the cacao pulp concentrate in a food product.

The methods as described herein provide utilization and conversion of cacao pulp in a range of nutritious and tasty food ingredients suitable for further use in food products. The said cacao pulp derived ingredients are characterized by a superior taste and texture, as well as the broad applicability compared to cacao pulp products known in the prior art.

DETAILED DESCRIPTION OF THE INVENTION

The present invention concerns the utilization of cacao by-products as food ingredients. In particular, the invention pertains to utilization of cacao pulp, substantially devoid from cacao beans and cacao pod husks for preparation of various cacao pulp derived food products. The invention provides a method for processing cacao pulp derived material by means of simple, fast, easily controllable and reproducible processes. The resulting cacao pulp derived products are of a controllable and well-defined composition and thus suitable for use in the food industry.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a concentrate" refers to one or more than one concentrate.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The terms "cacao" and "cocoa" are both used to refer to the same items. For example, "cacao" beans are often referred to as "cocoa" beans. In the present application, generally the term "cacao" is used to refer to the used materials originating from *Theobroma cacao*.

The term "cacao pod" refers to a cacao fruit, which comprises cacao pod husks, cacao pulp and cacao beans.

The term "cacao pod husk", as used herein, means the outer peel i.e. husk of cacao fruit, substantially devoid from cacao beans.

The term "cacao bean shell", as used herein, means the outer portions of cocoa beans that encase the nibs, and are also known as cocoa shells and hulls.

The "organoleptic profile", as used herein, means the aggregate of all olfactory and gustatory sensory experiences associated with tasting of a certain food.

The sensory experience of eating is an important determinant of food intake and preference towards certain food. As such, the sensory experience is often attributed to the positive hedonic response associated with certain sensory cues. The high content of glucose, fructose and sucrose in cacao pulp brings a fresh sweetness combined with a specific fruity acidity coming from citric acid naturally present in cacao pulp. In a first aspect, the invention is directed to a free-flowing cacao pulp derived powder, obtainable from cacao pulp material, wherein said cacao pulp material is fresh cacao pulp, cacao pulp juice, cacao pulp concentrate or any mixture thereof.

Cacao pulp is present in cacao pods in significant amounts and is only partially utilized for cacao bean fermentation. Fresh cacao pulp is comprising water as the main constituent, and significant amount of sugars (Table 1), which make it prone to degradation and microbiological contamination. Thus, fresh cacao pulp requires pasteurization, has a relatively short shelf life and is subject to enzymatic browning.

During the fermentation of cacao beans, natural yeasts and bacteria multiply in the pulp, causing the breakdown of the sugars and mucilage. During this process, much of the pulp drains away as a liquid.

TABLE 1

The composition of fresh cacao pulp and dry matter derived from cacao pulp.

|  | Ecuador Batch A | Ecuador Batch E |
| --- | --- | --- |
| Moisture | 82.42 ± 0.02 | 82.64 ± 0.08 |
| Dry matter | 17.58 | 17.36 |
| Ash | 0.13 ± 0.01 | 0.43 ± 0.08 |
| Fat | 0.21 ± 0.06 | 0.17 ± 0.05 |
| Protein (Nx5.63) | 0.49 ± 0.02 | 0.52 ± 0.09 |
| Polyphenols | 0.049 ± 0.003 | 0.037 ± 0.04 |
| Fructose | 6.7 ± 0.6 | 7 ± 1 |
| Glucose | 6.5 ± 0.5 | 6 ± 1 |
| Sucrose | 0.05 ± 0.01 | 0.03 ± 0.01 |
| Soluble fibers | 2.01 | 1.72 |
| Insoluble fibers | 0.85 | 0.81 |
| Total fibers | 2.86 | 2.53 |

It has been surprisingly found that cacao pulp can be processed in a way to obtain free-flowing product. Such free-flowing cacao pulp derived powder is characterised by a higher stability and pleasant texture and as such said powder can be used as a food ingredient. The powder of the invention can be obtained in crystalline and amorphous form. According to the present invention, cacao pulp may be subjected to a process for reducing the acidity or the insoluble fibre content prior to obtaining the free-flowing cacao pulp derived powder of the invention.

The term "crystalline", as used herein, means the polymer substance which possess high degrees of inter- and intra-molecular order.

The term "amorphous", as used herein, refers to a solid which lacks fixed structural inter- and intra-molecular order.

The sugar content of said powder is high, making it particularly suitable for confectionery products. The cacao pulp derived products are characterised by a sweet, fresh and fruity cocoa aroma, so they can be used as healthy and tasty sucrose alternatives.

In a preferred embodiment of the invention, free-flowing cacao pulp derived powder is characterized by a moisture content of less than 12 wt %. The free-flowing cacao pulp derived powder of the invention is a highly hygroscopic material, and increase of the moisture content leads to a change in its structure and the texture. Thus, for use of said powder in food products, the moisture content is required to be less than 12 wt %, preferably less than 8 wt %, more preferably less than 5 wt %, most preferably less than 3 wt %.

The general problem with edible materials characterized by high, substantial amounts of glucose and fructose, is that they are very hygroscopic and tend to form lumps. In further processing of such materials, the increased content of moisture can lead to off-flavors of the product, hardening, and formation of lumps which cannot be broken later. Thus, the cacao pulp derived powder can contain maximally 12 wt % of moisture, in order to be a suitable ingredient for further processing.

In a further preferred embodiment of the invention, free-flowing cacao pulp derived powder is characterized by an organoleptic profile substantially identical to the cacao pulp.

Cacao pulp derived powder, cacao pulp juice and cacao pulp concentrate of the invention all have aroma and taste of the cacao pulp, which can be described as a sweet, mild cacao and fruity taste, combined with acidity originating from the citric acid present in the cacao pulp. In a preferred embodiment, fresh cacao pulp is subjected to the processing in order to reduce acidity and/or the fiber content in order to produce the cacao pulp derived material of the invention. Any acid neutralizing mixture suitable for the use in the food industry, typically chosen from basic or alkaline material non-injurious to health, such as, but not limited to, alkaline earth metal oxides, hydroxides, carbonates, and bicarbonates as well as alkali metal carbonates, bicarbonates, and alkaline phosphates can be employed to neutralize the acidity of cacao pulp. In one, non-limiting embodiment, said acid neutralizing mixture comprises calcium carbonate, potassium hydroxide, magnesium hydroxide, and potassium chloride or any mixtures thereof.

In order to reduce the content of soluble and/or insoluble fiber in cacao pulp prior to producing cacao pulp derived material of the invention, any suitable enzyme digestion method known in the prior art can be used. In a preferred embodiment, the enzyme pectinase is used to reduce the concentration of pectin. In another embodiment, cellulose is additionally used to decrease the amount of cellulose.

Food odors are an important sensory signal and an integral part of human flavor perception, shaping the way tastes and textures are experienced. Many food establishments use the tempting aromas of their products to entice in potential customers. Sensory cues based on a food's sight, smell, taste and texture are operational before, during and after eating a certain food product. Considering sensory characteristics as a functional feature of the foods and beverages we consume is an important aspect in preparation and development of food products.

Demand for cacao products is expected to continue to increase, mainly due to the universal appeal of the unique cacao flavor. Fine or flavor cacao have some ancillary flavors that are described variously as fruity, raisin, brown fruit, floral, spicy, aromatic, nutty, molasses and caramel.

Owing to its unique taste, texture and aroma, cacao products and chocolate are enjoyed by consumers all over the world. The flavor of cacao and chocolate is generated by several processing steps, the most important being the post-harvest fermentation and drying of cacao seeds, the roasting of raw cacao and the chocolate conching process. To date, about 600 volatile and partly odor-influencing compounds have been found in cacao and chocolate, following fermentation, drying, roasting and conching.

However, no unique 'chocolate compounds' have been identified and most of these substances are also found in other food. But these cacao volatiles interact and enhance each other to develop a pleasant and unique sensory experience. In chocolate, the flavor/aroma volatiles are active supplementary to the pleasant taste of non-volatile constituents. These range from the typical astringent mouth-feel of cacao polyphenols to the slight sour taste of cacao acids and from the bitterness of theobromine to the sweetness of sugar.

Biochemical mechanisms that contribute precursors for flavor begin as soon as the cacao is harvested. Even though the fermentation process facilitates the removal of the mucilaginous pulp and prevents germination of the beans, its primary importance is in the development of the chemical precursors, which will eventually be converted into the required chocolate flavors.

Thus, cacao pulp represents unexploited source of aroma ingredients that contribute to a cacao organoleptic profile. The present invention discloses the methods of processing cacao pulp to keep the original cacao aroma.

In a preferred embodiment, the cacao powder of the invention characterized by a sweetness value of 0.5-1.8, preferably 0.8-1.2. The freshly obtained cacao pulp contains mostly water and 10-15 wt % of sugars. While processing the cacao pulp into the cacao powder of the invention the content of sugar increases. Thus, the cacao pulp derived powder of the invention is characterized by a sweet taste, and can be used as a sucrose replacement in food products.

The present invention offers a solution to a problem of a high instability of fresh cacao pulp by transferring the pulp into a free-flowing powder which is not prone to degradation. However, the water content is dramatically reduced, but the other nutrients originally present in cacao pulp are also present in the powder of the invention. Thus, apart from sweetness, the powder of the invention has numerous nutritional benefits.

In a particularly preferred embodiment, the cacao pulp derived powder is characterized by a moisture content of less than 3 wt % and a sweetness value 0.8-1.2. Said values together with a free-flowing texture, make the powder of the invention a suitable sucrose replacement in food industry.

In another aspect, the invention relates to a cacao pulp juice, obtainable from cacao pulp substantially devoid from cacao pod husks and cacao beans, characterized by a value of 10-35 degrees Brix.

In a third aspect, the present invention relates to a method for producing the cacao pulp juice. The method is optimized for quick and efficient processing of highly perishable product such as fresh cacao pulp into cacao pulp juice and then further into a range of cacao pulp derived products, which are further used in food industry. In accordance with the invention, processing of cacao pods takes place in a sanitary facility. Adequately ripe and disease-free cacao pods are harvested at a cacao plantation and/or purchased from local growers. The selected unopened pods are transported at to the sanitary facility. The cacao pods are rinsed with water, and further cleaned of needed. The cleaned cacao pods are opened under sanitary conditions by workers wearing rubber gloves and using clean, uncontaminated cutting tools, such as clean machetes, or any other suitable equipment, as appropriate. A clean stainless steel platform or table may be used to position the pods for cutting. In one embodiment, opening the pods is carried out at a sanitary location, minimizing the likelihood of the pulp and mucilage microbial contamination. In another embodiment, after harvesting the cacao pods, the pods are directly open in the field and seeds and pulp are collected in appropriate clean containers. The containers are then transferred to a depulping site.

The beans and pulp are taken out of said containers and promptly placed in a depulping machine to separate the pulp from the seeds.

The depulping machine, also known as a separator, finisher, depulper, or refiner, may take the form of any suitable mechanic separator, such as, but not limited to, a paddle separator or a screw separator. Such machines separate liquids and solids by removing relatively larger particles, including seeds, from the puree and juice of a fruit.

Screw separators have a screw or auger surrounded by a cylindrical or conical screen. The rotating auger drives the food product forwardly and also against the screen. Liquids and small particles pass through the screen and are collected while larger solids are carried by the auger to the discharge end of the screen. A discharge end port or valve provides back pressure to help force the juice portion through the screen. One exemplary screw depulping machine is disclosed in U.S. Pat. No. 3,370,527, the disclosure of which is hereby incorporated by reference.

Paddle depulping machines have a cylindrical screen with a rotating central axle on which paddle blades are affixed. The blades sweep around the cylindrical screen and pulp and mucilage is extruded through the screen while seeds are carried to an exit. One exemplary paddle depulping machine is disclosed in U.S. Pat. No. 5,598,772, the disclosure of which is hereby incorporated by reference.

In a preferred embodiment, the mucilaginous pulp is removed from the cacao beans using a paddle depulping machine described in more detail below. The bean bunch, which includes the beans, mucilage and pulp is taken from the sanitary containers and fed into the paddle depulping machine. The bean bunch is transported from the inlet by a screw feed mechanism to a pulp separating zone. The blades of the paddle depulping machine interact with a cylindrical sieve to gently separate the pulp and mucilage from the seeds of the fruit without causing damage to the seeds. The treated seeds exit from the paddle depulping machine seed outlet and are left with a consistent amount of pulp and mucilage. The separated pulp is processed into a homogenized mixture, which is collected at a pulp output.

In a further preferred embodiment, depulping is conducted on a paddle depulper equipped with a centrifuge, which performs an additional centrifuging step to separate the remaining of cacao beans from the pulp. The separated pulp is collected in suitable containers and further subjected to cooling or further processing.

In preferred embodiment, the depulping machine separates pulp and mucilage from the seeds, leaving a portion of the pulp and mucilage on the seeds.

The separated pulp and mucilage will be 60% or more, or more preferably 70% or more, or most preferably 80% or more, up to 98% of the pulp and mucilage present originally on the seeds. Thus, the desirable amount of separation of pulp and mucilage is 60%-98%, more preferably 70%-98%, and most preferably 80%-98% of the pulp and mucilage on the seeds.

In a preferred embodiment, about 80%-90% of the cacao pulp is removed from the seeds.

The amount of separation is determined by the residence time of the cacao seeds in the depulping machine (which is in turn determined by the angle of the blades to the axis of the central axle); and by the rotational speed of the paddles or screw.

Higher percentages of separation are obtained with longer residence times and higher rotational speeds; lower percentages of separation are obtained with shorter residence times and lower rotational speeds.

The removal of part of the pulp and mucilage from the cacao seed does not interfere with cacao bean fermentation. The reduction of pulp before fermentation increases the quality of cacao beans because the acidity produced during fermentation is reduced. The depulping machine prepares the seeds for fermentation by removing part of the pulp from the seeds, resulting in seeds having a higher amount of fructose, aroma compounds, aroma precursors, ester-precursors, free amino acids, aromatic bioactive molecules, alkaloid compounds, sugars, carbohydrates, and enzymes.

The processed cacao seeds are fermented using a cacao pulp simulation media treated with a starter culture, for example, a mixture of specific strains of lactic acid bacteria and acetic acid bacteria. It has been found that cacao seeds with a reduced pulp and mucilage content, e.g. about 10% of the original content, when fermented with a cacao pulp simulation media, provide cacao beans of a more uniform and consistent high quality as compared to cacao beans fermented using traditional techniques.

In a further preferred embodiment, a depulping machine is selected to optimize the separation of pulp and mucilage from the beans without damaging the beans. In a preferred embodiment, the beans are rubbed against the cylindrical sieve and against each other to remove the pulp and mucilage without damaging the beans.

The depulping machine may remove up to 98% of the pulp and mucilage without damaging the seeds.

The depulping machine is cleaned with a water and appropriate washing substance prior the use and after each depulping cycle. In a preferred embodiment, the soap is used to clean the depulping machine. The "waiting" time between arrival of cacao pod husks and depulping is less than 3 hours, preferably less than 2 hours, most preferably less than 30 min.

The depulping machine homogenizes the separated mucilaginous pulp, which is collected as it flows out of the depulping machine. The collected cacao pulp is tested periodically for purity and quality, including testing of pH, microbial content, sugar content (degrees Brix), and product color and odor.

In the preferred embodiment of the process, each step occurs promptly upon the conclusion of the prior step, so that the obtained pulp has minimal exposure to air, thus preventing undesirable oxidation or microbial alteration of the product. As used herein, "promptly" means that there is a time period of less than 3.5 hours, more preferably a time period of less than one hour, and most preferably a time period of less than 30 minutes, between each step. The above described process provides a cacao pulp which is smooth, sanitary, with little or no oxidation or degradation of the cacao pulp and its healthful vitamins, antioxidants, polyphenols and other nutrients.

After mechanical depulping, collected cacao pulp is treated by a suitable enzyme to break down the pectin present in cacao pulp. In a preferred embodiment, said enzyme is pectinase. According to the invention, collected cacao pulp is treated in aqueous suspension of pectinases, optionally together with another enzymes, such as, but not limited to cellulases and hemicellulases. Prior enzymatic treatment, the cacao pulp contains about 0.5-4.5 wt % of soluble fiber, such as pectin, together with 0.1-1.5 wt % of insoluble fiber, such as cellulose and hemicellulose. The aim of enzymatic treatment is to lessen the soluble and insoluble fiber contents, as said fiber would interfere in further processing of cacao pulp in cacao pulp juice, cacao pulp concentrate and cacao pulp derived powder.

For the process of the present invention, commercial products of this type having an activity of at least 150 PGU/mg for the pectinase. One PGU, as used herein is that quantity of a pectolytic enzyme which lowers the viscosity of a standard pectin solution containing 1 mg of pectin by an amount $\Delta I/\eta_{sp}=0.05$ in 40 minutes at 30° C. and at pH of 4.0. Cellulase used should be of at least 150 cellulose activity units/mg. One cellulase unit, as used herein, is defined as that quantity of enzymes which decomposes a 1×1 centimeter piece of standardized filter paper (Toyo Roshi No. 51a, special) in 50 ml of a M/20-acetate buffer at pH 4.0 in a L-tube in 30 minutes. The cellulase employed should be active against native cellulose ($C_1$-activity).

Each of the enzymes is added in a concentration of 100-10000 ppm, preferably 500-2000 ppm, most preferably about 1000 ppm by weight of collected cacao pulp. However, these amounts can be increased or decreased if the working temperature and the time of treatment are correspondingly altered.

The collected cacao pulp is subjected to the enzyme treatment in an aqueous suspension of the highest possible concentration. The pH value of the suspension is chosen to correspond to the optimum efficiency of the pectinase employed. This lies at somewhat different values according to the origin of the enzyme, preferably in range pH 3-6.6, more preferably between pH 4 and 6.

In a preferred embodiment, the pectinase or any other suitable enzyme or a mixture thereof is added to a collected pulp in a concentration of about 1000 ppm. The pulp and enzyme mix is heated to a temperature 25-60° C., preferably 35-45° C., and the mixture is kept in these conditions for 10-60 min, preferably 20-30 min, to ensure the enzyme activity. After the pulp fluidity increases (after approximately 30 min), the optional steps of removing of the water insoluble parts, clarification of the cacao pulp juice, and filtration of the cacao pulp juice are performed. These steps can be executed in any order and can be combined or repeated, if necessary. The aim is to obtain a clear cacao pulp juice of a lower viscosity than the fresh cacao pulp. Cacao pulp juice of the invention can be optionally pasteurized. The pasteurization process is performed by heating of said juice to a temperature of a temperature between 70-100° C., preferably 85-95° C., during 10-90 sec, preferably 30-60 sec. The pasteurization step ensures the microbiological quality and a longer shelf life of the obtained cacao pulp juice.

In another aspect of the invention, the cacao pulp juice can be further concentrated to obtain a cacao pulp concentrate. This process is performed by increasing the temperature 80-105° C., preferably, 90-100° C., with stirring. In case any scum appears on the surface of the mixture, it should be removed. The boiling process of cacao pulp juice should be lasting about 1-6 h, preferably about 4 h to eliminate as much water as possible and obtain cacao pulp concentrate. The value of Brix degree and pH value are periodically measured. The cacao pulp concentrate is obtained when the degree Brix reaches the value of 35-90.

The collected cacao pulp juice or cacao pulp concentrate is optionally packaged in suitable containers, which can be sterile. In a preferred embodiments, said containers are sterile sealed plastic bags. Bag size is selected depending on the intended market for the product. For consumer purchasers, smaller 2-4 liter bags will be used. For bulk purchasers, the cacao juice or cacao pulp concentrate is packaged in plastic bags or bladders sized to hold about 30 kilograms, e.g. 40-50 liter bags. The bags of packaged cacao pulp juice or concentrate can be frozen prevent spoilage. Freezing can be accomplished in a conventional freezer but superior results are obtained by freezing in a freezing tunnel. One optional freezing tunnel embodiment is an individually quick frozen freezing tunnel available from a number of manufacturers. The 30 kg bulk bags will typically be frozen at −18° C., over a 12-24 hour period. The frozen cacao pulp juice or cacao pulp concentrate is transported in a refrigerated container to a requested destination.

The cacao pulp juice or cacao pulp concentrate or any mixture thereof can be used for preparation of cacao pulp derived powder or any food or beverages, such as, but not limited, dairy products, chocolate drinks and smoothies. Said beverages comprising cacao pulp material of the invention represent healthy and desirable alternative to sodas and similar beverages. It will be appreciated by persons skilled in the art that the present invention is not limited to what has been particularly shown and described herein above. Once that cacao pulp juice, cacao pulp concentrate or any mixture thereof is thawed, it can be mixed with water, then optionally pasteurized at 65° C.-150° C. for 0.1-300 seconds, then re-frozen and stored for two weeks. The pasteurization of said products can be repeated if necessary.

The present invention provides a cacao pulp juice of a high purity and yield and provides a process that allows the use of cacao pulp products on a commercial scale. In particular, the present invention provides a cacao pulp juice and cacao pulp concentrate which are sanitary and not contaminated with organic matter and microbes, which are fresh and not fermented and in which desirable nutrients including complex sugars, polyphenols and other antioxidants are preserved and not degraded by oxidation or microbial activity.

In the present method fresh pulp, as a highly perishable product, is processed to obtain a cacao juice which keeps nutritional properties and has better stability. Said cacao pulp juice can be further concentrated in a very simple way to obtain cacao pulp concentrate. Finally, fresh cacao pulp, cacao pulp juice and cacao concentrate or any mixture thereof, can be processed to obtain cacao pulp derived powder of the invention. A method for obtaining the free-flowing cacao pulp derived powder from cacao pulp material comprises the steps of: a) concentrating said cacao pulp material to a value of 70-95 degrees Brix; b) first kneading; c) adding of seeds for crystallization; d) repeated kneading to obtain a crystal growth; e) temperature-pressure treatment until formation of a solidified product, preferably temperature-pressure treatment at a temperature of 45-100° C. and pressure of 5-1000 mbar until formation of a solidified product; f) drying of the solidified product to obtain cacao pulp derived powder. The starting cacao pulp material for this process can be fresh cacao pulp, cacao pulp juice, cacao pulp concentrate or any mixture thereof.

The initial step of producing cacao pulp derived powder is concentration of cacao pulp material until it becomes supersaturated. Aqueous sugar solutions are efficiently supersaturated by evaporative boiling, even the processes such as cooling, evaporating, and precipitating can be used. The first step of the method of invention is concentrating cacao pulp material at a temperature 90-140° C., preferably 100-130° C., with stirring. In case any scum appears on the surface of the mixture, it should be removed. The boiling process of cacao pulp juice should be lasting about 2-10 h, preferably about 4 h to eliminate as much water as possible and obtain cacao pulp concentrate. The value of Brix degree and pH value are periodically measured. The suitable material for kneading is obtained when the degree Brix reaches the value of 70-95. The kneading can be performed on any kind of suitable kneading device, which is able to ensure the uniform composition, color an aroma of the mixture which is kneaded. Kneading is performed with a mixer equipped with a dough hook, or spiral kneading machine, or the like. This process continues until the obtained cacao pulp becomes elastic and smooth.

In the preferred embodiment, the free flowing cacao pulp derived powder of the invention is a crystalline powder. Once the kneaded mixture is elastic and smooth, nucleation; i.e. the formation of the crystalline phase from supersaturated solutions occurs. Nucleation can occur spontaneously, but in preferred embodiment, nucleation is induced by mechanical means, causing crystallization of the sugar. Since sugar has a positive heat of crystallization, the heat evolved during crystallization will tend to evaporate water from the solution. Provided a suitable balance of temperature and concentration of the sugar syrup is achieved, essentially complete vaporization of water can be attained to produce sugar having a very low moisture content. In order to prevent the formation of a solid mass of sugar crystals, it is necessary that the cacao pulp obtained sugar syrup should be kept well agitated during crystallization. In a preferred embodiment, this is achieved by stirring, e.g. using paddles, which may themselves provide the required nucleation.

Crystallization of sugar is complex process. The growth of crystals involves simultaneous transfer of heat and mass in a multi-phase, multi-component system. While the coexistence of these conditions alone present complex control problems, fluid and particle mechanics and thermodynamic instability create further complications. Thus, as crystallization proceeds, the repeated kneading takes place to break up and homogenize the crystallizing sugar mass, which leads to a crystal growth. Any suitable kneading machine possessing the required energy to complete this process can be used. Repeated kneading prevents the eventual clogging of the equipment by the crystallizing sugar. In the preferred embodiment any suitable cooling system during the crystallization and repeated kneading can be employed to avoid excess heat generation and consequent caramelization of the cacao pulp material of the invention.

Any suitable additive can be optionally included in this stage. This is referred to herein as co-crystallization. When such an additive is provided, it is included without deteriorating the resulting crystalline structure. Additives contemplated for use herein include, but are not limited to, flavorants, bio-affecting agents, dyes, fragrances, food products, food ingredients, and other compatible agents. Flavorants in the present invention includes sweeteners of all types, natural and synthetic.

The obtained cacao pulp material is further subjected to temperature-pressure treatment until formation of a solidified product, preferably temperature-pressure treatment in controlled conditions at 45-100° C., and pressure of 5-1000 mbar until formation of the solidified crystalline product. The controlled temperature conditions should prevent the caramelization of the sugar components preset in the cacao pulp material.

The following step to ensure the low moisture content of a free-flowing cacao pulp derived powder is drying. As used herein, "dry" or "dried" include particles that include some moisture, preferably not more than 5% by weight. Dry particles include those particles which include from 0.0001% to 1% moisture, from 1% to 3% moisture, from 1% to 5% moisture, from 5% to 12% moisture, and combinations of those ranges. Various additives may be used in the drying methods of the invention. These additives may be added to the substance of interest or any solvent used in the process. Additives may also be added directly to the particles after formation. Additives include stabilizers, excipients, bulking agents and surfactants. The use of stabilizers protects against loss of crystalline structure upon drying. Stabilizers include, without limitation, sugars and hydrophilic polymers, such as polyethylene glycol, hydroxy ethyl starch, dextran or others. One or more surfactants can be added to alleviate stresses between droplet/air interfaces and decrease degradation that may occur upon drying. Surfactants may be added to alleviate agglomeration or clumping that may occur upon drying.

Said drying process can be any conventionally used drying process convenient for food products characterized by a high content of sugars, such as, but not limited to, a spray drying, freeze drying and drying in a stream of gas. The suitable drying technique is used to obtain a free-flowing solid characterized by a moisture content less than 12 wt %, preferably less than 8 wt %, more preferably less than 5 wt %, most preferably less than 3 wt %, while original organoleptic profile of cacao pulp is preserved. The drying is carried out for a minimum 1 hour to a maximum of 72 hours, and it can be repeated if necessary. As a result of the drying process, a free-flowing cacao pulp derived powder is provided. This free-flowing powder has been found to be particularly suitable for products which require a uniform particle size.

In a preferred embodiment, said product is a new chocolate product substantially comprising the free-flowing cacao pulp derived powder of the invention. The resulting chocolate product is smooth and flowable, and of a very pleasant texture and aroma.

In one embodiment, said drying process is lyophilization, i.e. (freeze-drying).

The term "lyophilized", as used herein, refers to the lyophilization, freeze-drying, or vacuum drying of solid material to remove the excess water content and obtain a solid of desired moisture content. Any conventional freeze-dryer equipped with a vacuum chamber, shelves, process condenser, shelf-fluid system, refrigeration system, vacuum system and control system is suitable. Said freeze dryer is a cabinet-type freeze dryer, contact freeze dryer, radiant freeze dryer, microwave-assisted freeze dryer, and the like.

The freeze-drying or lyophilization is most commonly used method for the elimination of residual solvent. This elimination happens after freezing of the product and its placing under a vacuum, allowing the ice to change directly from solid to vapor without passing through a liquid phase. The process consists of three separate, unique, and interdependent processes; freezing, primary drying (sublimation), and secondary drying (desorption). The lyophilization process ensures removal of any remaining water so the lyophilized substance is can be subjected to grinding to desired particle size. Regarding the conditions of the lyophilization process, any suitable combination of parameters to obtain a dried free-flowing powder can be used. In preferred embodiment, the method comprises atomizing a liquid cacao pulp solid into a cold fluid to prepare frozen droplets. The water is removed from the droplets to form powder particles and the particles are recovered. In a further preferred embodiment, the solid is subjected to freezing followed by reduced pressure evaporation. The method may additionally comprise an annealing step, wherein the temperature of the frozen droplets is raised prior to the removal of the water. Obtained dry cacao pulp derived powder of the invention is characterized by an enhanced stability, as the water is removed without excessive heating.

In another embodiment spray drying is used to remove an excess solvent and obtain the free-flowing cacao pulp derived powder of the invention. Spray drying is a dehydration process that utilizes heat from a hot gas stream (usually air) to evaporate dispersed droplets created by atomization of a continuous liquid feed. In the spray-drying technique, a jet nebulizer is used to form a plume of droplets. In one type of nebulizer, a liquid sample is sucked through a small diameter tube by a high-pressure stream of gas. The gas breaks up the liquid into fine droplets. The gas can also flow across the small diameter tube at right angles and form droplets in a similar manner. Ultrasonic nebulizers use ultrasonic vibrations coupled to the sample solution that cause the solution to break up into small droplets. Using these methods, products can be dried within a few seconds into fine particles.

One disadvantage of the method of spray-drying is the plume of molecules exiting the jet nebulizer is not very dense. The major concern is, however, thermal denaturation and structural alterations of the dried material. This is generally attributed to the loss of hydration water molecules required to form hydrogen bonds which stabilize the structure. That is the reason why spray drying is generally done with carriers that can act as water-replacing agents. In the preferred embodiment, different materials can be used as carriers in a spray drying process. In a preferred embodiment, said carriers are agents such as, but not limited to, maltodextrin, milk powder, skimmed milk powder, cacao powder, natural cocoa powder, natural cocoa cake, alkalized cocoa powder, alkalized cocoa cake, defatted cocoa powder, defatted cocoa cake, alkalized defatted cocoa powder, alkalized defatted cocoa cake, cacao pod husk powder, cacao bean shell, cacao bean shell powder, fiber rich material, fiber enriched cacao pod husk powder, and the like. In a further preferred embodiment, said carrier is a cacao pod husk powder comprising a water insoluble matter of the fresh cacao pulp.

In a further preferred embodiment, an extrusion process is performed after the spray drying.

The spray dried powders are characterized by a high stickiness and the low shelf life. Typically, a large sugar quantities are present at the surface of the carrier material. This enables the interaction of the powder of the invention with other particles, which results in formation of undesirable lumps. That is the reason for subjecting of the spray dried cacao pulp derived powder, composed of preferably a 50 wt % of cacao pulp material and a 50 wt % of carrier, to an extrusion process with small water addition.

The terms "extrusion" and "extruder" are well known to the person skilled in the art of preparing food products. Extrusion can be performed in a batch-wise or a continuous manner. The present invention is preferably performed in a continuous manner, with ingredients being added to the extruder during extrusion. Extrusion involves submitting the ingredients to pressure and preferably increased temperatures, with the mixture preferably being passed through a die. A preferred form of extruder is a screw extruder, in which a helical screw rotates within a barrel, causing mixing, compression and heating of the mixture. In a further preferred embodiment, a twin screw extruder is used. As is known to a person skilled in the art, various forms of extruders are commercially available. Such industrial extruders allow control and measurement of various aspects of the extrusion process, such as the temperature of the mixture within the barrel, the pressure of the mixture within the barrel and the speed of rotation of the screw. A preferred extruder is a twin screw extruder. Another preferred aspect is the use of a multi-section extruder which allows for control of operating parameters within each of the sections independently. A three section extruder is most preferred.

Typically, the combined cacao pulp material and carrier are transferred to an extruder, or may undergo a preconditioning step prior to extrusion. The preconditioning step involves heating and/or agitation the mixture of cacao pulp material and the carrier. Preferably, the pre-conditioning step comprises heating the mixture to a temperature of from about 30 to about 95° C., most preferably to about 90° C. Preferably, the mixture is agitated by kneading. In a preferred embodiment, the pre-conditioning step comprises agitating and/or heating the mixture for up to about 300 seconds, most preferably about 220 seconds. Additional components are added to the mixture during the preconditioning step. Optionally, water can be added during the extrusion process. The amount of added water is below 10 wt %, preferably below 5 wt %. The dry mixture containing the cacao pulp material and carrier is mixed with water and extruded at high pressure and an exit temperature not lower than 100° C. after the extruder exceeding evaporation temperature of the water. In a preferred embodiment, the extrusion is performed using a twin screw extruder. In a further preferred embodiment, the extrusion is performed using a multi-section extruder. The temperature of the mixture in the extruder is from about 10° to about 250° C. Preferably, the temperature of the mixture in the extruder is about 140° C. The extrusion is performed in a screw extruder with a screw speed of from about 100 to 620 rpm. In a preferred embodiment, the screw speed is about 500 rpm. The extruded product can be optionally cut into smaller pieces. Subsequently, the product is subjected to a drying step, using any conventionally known technique to reduce the overall level of moisture. Preferably, the product is dried until it has a moisture level of less than about 5 wt %, more preferably from about 1-3 wt %. The drying step may involve techniques such as exposing the product to a flow of heated gas, such as hot air, infrared radiation, exposure to a pressure less than atmospheric pressure, for example in a vacuum oven, and the like.

The particles of a cacao pulp material are located mostly inside the carrier particles. The contact between the particles is dominated by the properties of the carrier, thus, with a stable carrier being used, a more stable end product is obtained even with highly sticky and hygroscopic ingredients. The method of the invention allows the application of any direct, indirect or hydrostatic extrusion method at a screw extruder (single and twin screw extruders), sieve extruder, basket extruder, roll extruder, ram extruder and the like. The parameters during extrusion such as particle size of the raw material, barrel temperature, screw speed and moisture content should be adjusted, so to avoid possible caramelization of sugars present in cacao pulp derived powder of the invention. In a preferred embodiment, a screw speed of 150-350 rpm, with 1-3 kg water/hr, feeder 15-25 kg/hr, cutter 2000-3000 rpm is used.

In a preferred embodiment, cocoa powder and cocoa cake are suitable components to be used as carriers in production of free-flowing cocoa pulp derived powder. These terms have the following meanings. In the production of cocoa products, cocoa beans or seeds are harvested, fermented (partly or fully), dried and the shells removed to extract the inner part of the beans (nibs). The nibs may be ground to a semi-liquid state called cocoa liquor. The cocoa liquor may then be processed to remove a portion of the cocoa butter, which is typically performed in a hydraulic press. The cocoa liquor is effectively sieved under pressure to remove cocoa butter, leaving behind cocoa solids and a proportion of cocoa butter. The compressed mass left behind after this compressive defatting is called cocoa cake. Cocoa butter may also be removed from cocoa liquor by an expeller, which generally compresses the cocoa butter from the cocoa liquor in a continuous manner. The solid cocoa product produced by this process is called expeller flake. In this specification, the term "cocoa cake" is preferably meant to encompass expeller flake.

The cocoa cake may then be further processed by pulverizing and/or grinding to produce cocoa powder. In general, the particles of cocoa powder are smaller than the particles of cocoa cake. It is preferred that the cocoa powder is not micromilled cocoa powder. Preferably, at least 99.5% of the particles of cocoa powder are less than 75 microns in size (methodology OICC 38). It is preferred that a significant proportion of the cocoa powder has a particle size above 20 microns.

The cocoa powder and/or cocoa cake is preferably natural. Alternatively, alkalized cocoa powder and/or cocoa cake is used. Also, the use of defatted cocoa powder and/or cocoa cake is preferred.

The invention can use cocoa powder and cocoa cake having the fat content of from 20 to 22% fat (non-defatted cocoa powder or cocoa cake). Preferably, the cocoa powder or cocoa cake is defatted and contains from about 10 to about 12% fat. Cocoa powder and/or cocoa cake with a lower level of fat may be used, for example below 1% fat, using alternative methods such as the use of supercritical carbon dioxide extraction. In general terms, a defatted cocoa powder or cocoa cake has below about 18% fat.

The requirements for the particle size are that 97 wt % is below 30 µm, preferably 100 wt % below 30 µm, and prior to an extrusion process. After the extrusion, additional grinding can be performed to obtain a powder wherein 97 wt % of particles are of the size below 30 µm. The fineness of the powder can change, depending of the potential use of the cacao pulp derived powder of the invention. However, it is important that the initial fineness of the cacao pulp on a carrier and end powder are comparable in range, to ensure the functionality of the powder of the invention.

In another embodiment, drying is performed passing a stream of gas over wet crystals. The gas may be selected from the group consisting of: nitrogen, argon, helium, carbon dioxide, air or combinations thereof. In a further preferred embodiment, drying is done in a stream of supercritical carbon dioxide ($CO_2$).

Supercritical fluids are substances at a temperature and pressure above a critical temperature and pressure where the substance has a density, compressibility and viscosity intermediate between a gas and a liquid. Near-critical fluids are similar to supercritical fluids and are defined as fluids within 10% of the critical temperature and the critical pressure. Supercritical fluids have been researched for their use in the production of fine powders of pharmaceuticals and other applications.

Drying of low molecular weight sugars is not a typical process, as it is associated with problems such as lumping and hygroscopicity of the dried material.

It has been surprisingly found that a novel technique of spray drying used on cacao pulp material allows obtaining the free-flowing powder of uniform particle size. In a preferred embodiment, the free-flowing cacao pulp solid is mixed with a supercritical $CO_2$, and the release of pressure in a spraying chamber removes the water from the cacao pulp solid. The temperature of the process is not exceeding 95° C., preferably not exceeding 45° C., and the pressure is 0.01-35 MPa. The resulting powder is free flowing and not sticky in a high yield of at least 60 wt %, preferably 80 wt %, more preferably 90 wt %.

In a preferred embodiment, the cacao pulp derived material is dried using $CO_2$ assisted drying. $CO_2$ assisted drying was shown to be a suitable method for micronizing and drying cocoa pulp material into a cacao pulp derived powder and can be performed with or without using the suitable carrier. The cacao pulp juice or concentrate is typically loaded into a high-pressure injection pump, or any suitable spraying device. The pump is used the cacao pulp derived material at a predetermined flow rate into the high-pressure vessel. A co-axial nozzle was used to spray the juice and $CO_2$ together. During mixing of the juice and supercritical $CO_2$, $CO_2$ is quickly dissolving in the water causing the precipitation of the solutes by anti-solvent effect. These precipitates are collected on a paper filter on the bottom of the vessel. Once the spraying is finished, the collected powder was rinsed with fresh supercritical $CO_2$ to ensure complete removal of the water. In a further preferred embodiment, $CO_2$ assisted drying is performed with using of the carrier. Preferred carriers are pectin and sucrose, as being present natural in the cacao pulp derived material, or can be other commonly used carriers, such as starch. In the further preferred embodiment, pectin is used as a carrier. The anticaking agent, such as starch is optionally employed. The weight ratio of cacao pulp material to carrier is ranging from 1000:1 to 1:1, preferably from 150:1 to 20:1. Temperature of the drying process is ranging from 5° C. to 95° C., preferably 30 to 45° C., and the flow rates of injected pulp material and $CO_2$ flow are typically kept in the interval 0.01-10 000 ml/min, preferably 0.5-100 ml/min at a pressure of 0.01-35 MPa. Drying in a stream of $CO_2$, according to the invention, may allow obtaining cacao pulp derived powder of any particle size, the choice of said size being dependent on the application. Regarding the use of cacao pulp derived powder for chocolate production, D(97) is less than 100 μm, preferably D(97) is less than 50 μm, most preferably D(97) is less than 30 μm. For application in other confectionary products, the coarser powder with D(97) value of higher than 100 μm may be required.

The prior art discloses the manufacturing procedures for crystallizing sugar which energy intensive. Moreover, nucleation of sugar crystals during supersaturation is relatively uncontrollable. Consequently, the size and shape of the resulting crystals are unpredictable.

The advantage of the method of the invention is obtaining cacao pulp derived powder having reduced and controllable size of the cacao pulp derived powder particles. The process of the present invention enables the artisan to make product of a particular size and shape with a high degree of predictability. Reduced size crystals can be effectively produced without the need of energy intensive grinding and sieving. This is a significant departure from products and processes disclosed in the prior art.

In a preferred embodiment, for chocolate applications, individual particles of such free-flowing powder are, not greater than 100 μm, preferably not greater than 50 μm, most preferably not greater than 30 μm. It should be understood by a skilled person, that higher particles size may be desirable for production of specific confectionery products. The free-flowing powder of a particle sized higher than 100 μm is possible to obtain according to the method of the invention, just by simple adjusting of grinding parameters. In preferred embodiments, obtaining of said reduced size of cacao pulp derived powder crystals involves grinding and sieving free-flowing cacao pulp derived powder. Grinding of the cacao pulp derived powder of the invention can be done with a standard hammer mill, classifier mill or any other suitable milling system. In one embodiment, grinding is done with a milling device specialized to get fine particle size distributions. In this way a wide distribution of ground cacao pulp crystals should be avoided. The large crystals, if present, are reground and sieved.

It has been surprisingly found that obtained cacao pulp derived powder, cacao juice and cacao concentrate can be used in food industry for various applications. These products are characterized by satisfying stability and shelf life when compared to fresh cacao pulp, while they keep organoleptic properties and nutritional value of cacao pulp.

In addition there is the flavor and creaminess of milk components. The characteristic pleasant mouth-feel is produced by the melting behavior of cocoa butter. Furthermore, the particle size distribution, the viscosity and the hardness of the chocolate dispersion determine the perceived taste of the final chocolate product.

The invention is further described by the following non-limiting examples which further illustrate the invention, and are not intended to, nor should they be interpreted to, limit the scope of the invention.

EXAMPLES

The present invention will now be further exemplified with reference to the following example(s). The present invention is in no way limited to the given examples or to the embodiments presented in the figures.

Example 1: Preparation of a Cacao Pulp Juice of the Invention

This example illustrates an embodiment of the present method for processing fresh cacao pulp into the cacao pulp juice.

Freshly harvested ripe pods are opened and the cacao beans are removed. The recovered fresh cacao beans are first weighed and then passed through a paddle depulper having an inlet for beans at one end and a pulp outlet underneath and an outlet for depulped beans at the other end. The liquid pulp is expelled by a centrifuge mechanism. By using the depulper, the pulp is removed essentially uniformly from the cacao beans and the amount of pulp removed from the fresh cacao beans in the depulper is at about 85 wt %, based on the original combined weight of the beans and pulp. The collected fresh pulp was inspected for a value of Brix degrees (18-22) and pH (3.4)

Subsequently the 5 kg of collected fresh pulp is placed into usual fermentation vessel and enzymes pectinase and cellulase (in amount of 1000 ppm each) were added to the vessel. The temperature is controlled to be around 40-45° C., but not exceeding 45° C. The pulp was kept in a warm vessel with constant stirring for 20 min, when a fluidity increase was observed. After this, removing of the water insoluble parts by filtration and clarification of the cacao pulp juice were performed. A clear cacao pulp juice characterized with a low viscosity due to pectin and insoluble fiber breakdown was obtained. Said juice was subjected to a pasteurization process at a temperature of 90° C., during 45 sec. The obtained juice was characterized by a value of 18-22 degrees Brix and pH of 3.3. The weight of said juice was 4.6 kg.

Example 2: Cooking of the Cacao Pulp Juice to Obtain Cacao Pulp Concentrate

The cacao pulp juice (4.6 kg) obtained in Example 1 was heated to 80°-90° C. under vacuum of 500-800 mPa, with constant stirring. The scum which was formed on the surface was removed, and degrees Brix and pH were measured every 30 minutes. The boiling took place for about 4 h and 15 min, to obtain 0.5 kg of cacao pulp concentrate characterized by 50-75 degrees Brix and pH of 3.2.

Example 3: Preparation of a Cacao Pulp Derived Powder Using Cacao Pulp Concentrate A sugar concentrate, obtained in example 2 initially containing about 25% water, 99.96% sugar (by weight of solids) and 0.015% ash (by weight of solids) was placed in a kneading tank to perform distributive and dispersive mixing during 2 h. The kneading system equipped with screw element KB May 2, 1930-90°, pitch (90, clockwise), staggering angle between sequential kneading discs (90), the element length (5 mm). Kneading is performed until the mixture is elastic and smooth. The subsequent nucleation of the mixture takes place in a through colloid mill for about 6 h, running at about 3000 rpm with a clearance between the cones of 300 microns. The mixture was subjected to a shear force having a velocity gradient of about 30,000 cm/sec/cm and a mean residence time of about 0.25 sec. The obtained material is then subjected to a thermal treatment at about 85° C. until formation of the solidified product. The temperature was strictly controlled to prevent the caramelization of the sugar components preset in the cacao pulp material. The solidified product was left the conveyor band for about 4 minutes and then particulated through a 1 cm wire screen and subsequently through a suitable mill fitted with a 4 mm mesh.

The solidified product was subjected to a one of the drying techniques.

Example 4: Freeze Drying of Solidified Product

In this example, the reduction of the water content in the solidified cacao pulp product is achieved via a sublimation process.

The cacao pulp solidified product was freeze dried using a Virtis Lyophilizer Model tray liophilizer. The sublimation phase was completed at a pressure of 0.055 bar. The shelf temperature was slowly reduced to −50° C. during the freezing step. This temperature was held for 14 h, and then the temperature was increased to 20° C. Secondary drying was then carried out at a temperature of 20° C. for another 18 hrs. The desorption phase was performed at a pressure of 0.030 bar. The shelf temperature was slowly increased from 20° C. to 25° C. in 1 h. the second phase was performed at a shelf temperature of 25° C. for 5 h.

The resulting free flowing cacao pulp derived powder had a moisture content of 0.85% by weight and desirable flavor characteristics. It has been observed that this technique remains most of the valuable taste of cacao pulp, including the fresh and sour notes. If said sugar is to be used in chocolate manufacturing, additional grinding step is performed to obtain $D(97)<30$ μm.

Example 5: Spray Drying of a Cacao Pulp Derived Powder of the Invention

In this example, the reduction of the water content in the solidified cacao pulp product is achieved via a drying in a stream of nitrogen using cacao pod husk powder as a carrier.

0.2 kg of solidified cacao pulp product was mixed with 0.2 kg of a carrier. The mixture comprising cacao powder was used as a carrier. The obtained mixture was transferred to a drying chamber and dried by passing a stream of nitrogen at approximately 10 psi pressure overnight.

After drying, the product was subjected to an extrusion with addition of 17.5 ml of water. The dry ingredients together with the addition of water or concentrate is then extruded at high pressures and an exit temperature after the extruder exceeding evaporation temperature of the water. The cacao pulp particles after the process are located rather inside the carrier, thus the obtained free-flowing powder is stable, with a nice texture and moisture content of 3.4 wt %.

The particle size distribution of $D(97)<30$ μm can be achieved by an additional grinding process.

Example 6: Supercritical $CO_2$ Drying of the Cacao Pulp Derived Powder of the Invention In this example, the reduction of the water content in the solidified cacao pulp product is achieved via a supercritical $CO_2$ treatment.

An aqueous stream and a stream of supercritical or near critical carbon dioxide (T>32° C., P=1500 psi) were each delivered at a constant flow rate of approximately 0.3 mL/min into each of two legs of a low dead volume mixing tee (Valco) using a HPLC solvent delivery pump (Waters model M-6000A) for the aqueous stream and a syringe pump (ISCO Model 260D, set to deliver at a constant pressure of 1500 psi) for the carbon dioxide. The two streams, initially at room temperature, were heated to just above 32° C., by a thermocouple-controlled cartridge heater attached to the mixing tee. The resultant emulsion that formed inside the mixing tee was allowed to expand out of the third orifice of the tee which was fitted with a 50 μm inner-diameter 5 cm long fused silica pressure restrictor (Alltech). The rapid decompression of the supercritical fluid as it exited the pressure restrictor, coupled with the explosive release of dissolved carbon dioxide from the aqueous solution caused the formation of very fine aqueous droplets containing some residual dissolved carbon dioxide. This aerosol was then directed into a custom-built drying chamber consisting of a 30 cm×2 cm borosilicate glass tube fitted with 4 gas inlet ports at the top of the tube and a powder filtration apparatus (stainless steel Millipore filter holder, 0.2 μm pore size cellulose acetate filter paper) followed by a cold trap and vacuum pump at the bottom of the tube. Heated dry nitrogen at a flow rate of approximately 15 l/min was added concurrently with the aerosol through the four gas inlet ports at the top of the drying tube. Additionally, the tube was heated externally with an infrared lamp to aid in the drying process and to keep water from condensing on the inner walls of the tube. The resultant temperature inside the drying chamber was maintained below 70° C. during nebulization, which was sufficient to cause rapid bubble drying.

Once the system was equilibrated by nebulizing and drying pure water for 10 to 15 minutes, the solidified cacao pulp was dissolved in concentration between 2 and 20 wt %, and injected into the aqueous feed line via an HPLC-type injection port. This type of injection port allows for very small volume aliquots (between 0.5 and 5 mL) of the aqueous protein formulation to be nebulized, dried and collected. The design of this system allowed for the collection of the dried free flowing cacao pulp derived powder under a constant purge of warm dry nitrogen, which was continued after completion of the experiment to remove excess water vapor from the drying chamber. Composition prior drying is shown in Table 2 and overview of the results is given in Table 3.

TABLE 2

Composition prior spray drying

| FeyeCon Batch ID | Carrier type | Amount of juice [g] | Amount of carrier [g] | Amount of water [g] | Procedure |
|---|---|---|---|---|---|
| BC_4 | Pectin (apple) | 100 | 1 | 18 | Pectin was initially dissolved in water, then the juice was slowly added while stirring |
| BC_5 | Corn starch | 100 | 1 | 0 | Juice was poured over the starch while stirring |
| BC_6 | Sucrose | 100 | 1 | 0 | Juice was poured over the sucrose while stirring |
| BC 7 | Pectin (apple) | 100 | 2 | 20 | Pectin was initially dissolved in water, then the juice was slowly added while stirring |

TABLE 3

Overview of the experimental results.

| FeyeCon Batch ID | $CO_2$ Flow | Temperature [° C.] | Carrier | Powder Weight [g] | Water activity | Observation |
|---|---|---|---|---|---|---|
| BC_1 | Medium | 40 | No | 0 | NA | Pasty powder could not be collected |
| BC_2 | High | 40 | No | 2.75 | 0.354@ 27.3° C. | Hard layer of powder on the filter, but possible to collect some powder |
| BC_3 | Low | 35 | No | 1.2 | 0.299@ 27.5° C. | Hard layer of powder on the filter, but possible to collect some powder |
| BC_4 | Low | 35 | Pectin_1 | 2.8 | 0.345@ 27.5° C. | Powder is still a layer but comes easier off then before. |
| BC_5 | Low | 35 | Corn starch | 1.17 | 0.319@ 27.3° C. | Powder is still a layer but comes easier off than before, |
| BC_6 | Low | 35 | Sucrose | 0.76 | 0.295@ 27.6% | Hard layer of powder on the filter, but possible to collect some powder |
| BC_7 | Low | 35 | Pectin_2 | 6.1 | 0.438@ 27.2° C. | Still a hard layer of powder but can be removed from the filter. |

Example 7: Cacao Beverage Made with Free-Flowing Cacao Pulp Derived Powder of the Invention Chocolate beverage A was prepared using 89.5 g of skimmed pasteurized milk, 0.5 g of defatted soluble cacao powder, 0.03 g of lecithin and 10 g of free-flowing cacao pulp derived powder of the invention. As a control product, chocolate beverage B containing 10 g of (common) crystalline sugar instead of free-flowing cacao pulp derived powder was made. Bothe beverages were heated to 80° C. while stirring with a homomixer. The beverage were further homogenized under a pressure of 150 kgf/cm2 using a homogenizer. Each beverage was filled in a glass bottle and sterilized at 121° C. for 30 minutes.

The both beverages were tested by panelists (15). The beverage containing free-flowing cacao pulp derived powder of the invention was evaluated by a higher score, as aroma was described as full, rich, fruity, creamy, caramel, hazelnut and pronounced cacao.

Example 8: Chocolate Made with Free-Flowing Cacao Pulp Derived Powder of the Invention Chocolate containing a mixture of 15 kg of cacao bean powder with 7.9 kg cacao liquor, 25.3 kg cacao butter, 50.3 kg of free-flowing cacao pulp derived powder, 25 kg whole milk powder, 17.5 kg low fat milk powder was mixed with 0.15 kg lecithin. The reference chocolate was made with the same ingredients, but it contained the crystalline sugar (sucrose) instead of free-flowing cacao pulp derived powder.

Both mixtures were kneaded and then worked in a 5-cylinder refiner.

The resulting masses were both subjected by conching and then treated like customary chocolate. Complete liquefaction of the reference mixture was completed by adding 8.9 kg cacao butter and 0.4 kg lecithin during conching.

The resulting liquid chocolate mixtures (test and reference mixtures) were tempered and molded in the devices for normal chocolate.

The chocolate end product made with free-flowing cacao pulp derived powder was very pleasant in taste and texture, as evaluated by panelists (15). Moreover, its texture and taste were preferred by a majority of panelists (12) and were described as a fresh and pronounced cacao taste. No difference is sweetness in the chocolate samples could be observed by the majority of panelists (14). It can be concluded that chocolate made with free-flowing cacao pulp derived powder of the invention has preferential taste.

Example 9: Example 9—Cocktail Containing Cacao Pulp Concentrate

Ingredients (By volume): 1 part of Rum (Maliu), 1.5 parts of pineapple juice, 1 part of lychee juice, 0.5 part of strawberry liqueur and 0.5 part of cacao pulp concentrate.

The cocktail is prepared by filling a shaker with ice cubes. All ingredients are added and mixture is vigorously shaken and poured into a highball glass filled with ice cubes. The cocktail is optionally garnished with strawberries.

The cocktail of the invention was tested by panelists (15), who evaluated it as a refreshing and very pleasantly sweet.

Example 10: Cookies Made with Supercritical $CO_2$ Spray Dried Cocoa Pulp 75 g of butter, 75 g of free-flowing cacao pulp derived powder ($CO_2$ spray dried cocoa pulp), 10 g of sugar, 1 egg, 0.5 g of vanilla flavor are mixed together to a well homogenized mixture. Another mixture is prepared by mixing of a rising agent (5 g) with wheat flour (150 g) and homogenizing the mixture.

Subsequently, the first mixture is added to the second one and mixed for 5 minutes.

The dough is divided in portions of about 100 g and 20 g of bake-stable dark chunks (20%) are added to each. The mixture is further divided into 3 parts of 40 g to obtain the final cookies. A baking rubber sheet is put onto the baking tray and each cookie is pressed into a metal ring (diameter 6 cm) to obtain the desired form. The ring is removed. The cookies are baked for 4 min at 170° C., 50% ventilation, 6 min on 160° C. with ventilation on 50%.

The cookies were characterized by a pleasant and fruity sweetness and a soft texture.

It is supposed that the present invention is not restricted to any form of realization described previously and that some modifications can be added to the presented example of fabrication without reappraisal of the appended claims. For example, the present invention has been described referring to cacao pulp concentrate as a starting material for free-flowing cacao pulp derived powder of the invention, but it is clear that the invention can be applied to cacao juice or fresh cacao pulp for the same purposes. The cacao pulp derived powder of the invention is suitable for use in chocolate production, but also can be applied in all sorts of confectionery products such as, but not limited to, jams, pastries, cookies, smoothies, milk beverages, juices, and the like.

It is clear that the method according to the invention, and its applications, are not limited to the presented examples.

The present invention is in no way limited to the embodiments described in the examples. On the contrary, methods according to the present invention may be realized in many different ways without departing from the scope of the invention.

The invention claimed is:

1. A free-flowing cacao pulp powder, obtainable from cacao pulp material, wherein said cacao pulp material is selected from the group consisting of fresh cacao pulp, cacao pulp juice, cacao pulp concentrate, and combinations thereof,
   wherein said carrier particles comprise a carrier, wherein the particles of said cacao pulp powder are located inside the carrier,
   wherein the cacao pulp powder has a moisture content of less than 8 wt %;
   wherein the weight ratio of cacao pulp material to carrier is ranging from 150:1 to 1:1; and
   wherein said carrier is selected from the group consisting of cacao powder, natural cocoa powder, natural cocoa cake, alkalized cocoa powder, alkalized cocoa cake, defatted cocoa powder, defatted cocoa cake, alkalized defatted cocoa powder, alkalized defatted cocoa cake, cacao pod husk powder, cacao bean shell, cacao bean shell powder, fiber enriched cacao pod husk powder, and; combinations thereof and wherein cocoa pulp powder has a crystalline structure.

2. The free-flowing cacao pulp powder according to claim 1, wherein said cacao pulp powder has a sweetness value of 0.5-1.8, wherein said sweetness value of said cacao pulp powder is determined by rating a sweetness of said cacao pulp powder relative to a sweetness of a sucrose, which has a sweetness value of 1.

3. The free-flowing pulp powder according to claim 1, wherein said cacao pulp powder has a uniform particle size.

4. The free-flowing pulp powder according to claim 1, wherein the particles of said free-flowing powder are not greater than 100 µm.

5. The free-flowing pulp powder according to claim 1, wherein said cacao pulp powder has a moisture content of not more than 5% by weight.

6. The free-flowing pulp powder according to claim 1, wherein said moisture content is obtained by spray-drying.

7. The free-flowing pulp powder according to claim 6, wherein spray-drying is performed with carriers that can act as water-replacing agents.

8. The free-flowing pulp powder according to claim 1, wherein said carrier is a cacao pod husk powder comprising a water insoluble matter of the fresh cacao pulp.

9. The free-flowing pulp powder according to claim 1, wherein said moisture content is obtained by CO2 assisted drying.

10. The free-flowing pulp powder according to claim 9, wherein said CO2 assisted drying is performed with carriers.

11. The free-flowing pulp powder according to claim 10, wherein said carriers are pectin or sucrose, as being present natural in the cacao pulp derived material.

12. The free-flowing pulp powder according to claim 10, wherein the weight ratio of cacao pulp material to carriers during $CO_2$ assisted drying is ranging from 1000:1 to 1:1.

* * * * *